United States Patent [19]
Limberg

[11] Patent Number: 5,852,477
[45] Date of Patent: Dec. 22, 1998

[54] DIGITAL TV RECEIVERS WITH POLY-PHASE ANALOG-TO-DIGITAL CONVERSION OF BASEBAND SYMBOL CODING

[75] Inventor: Allen L.R. Limberg, Vienna, Va.

[73] Assignee: Samsung Electronics Co., Ltd., Suwon, Rep. of Korea

[21] Appl. No.: 882,542

[22] Filed: Jun. 25, 1997

[51] Int. Cl.⁶ .............................. H04N 5/455; H04N 9/08
[52] U.S. Cl. ............................ 348/725; 348/21; 375/350
[58] Field of Search .............................. 348/607, 21, 728, 348/726, 554, 553, 572; 375/265, 347–350, 232, 236, 239; 371/43.1

[56] References Cited

U.S. PATENT DOCUMENTS

| | | | |
|---|---|---|---|
| 5,636,251 | 6/1997 | Citta et al. .............................. | 357/341 |
| 5,648,822 | 7/1997 | Hulyalkar .................................. | 348/21 |
| 5,717,471 | 2/1998 | Stewart .................... | 375/265 |
| 5,812,957 | 4/1996 | Hulyalkar ................................ | 375/350 |

*Primary Examiner*—Victor R. Kostak

[57] ABSTRACT

A digital television signal receiver includes, instead of a single flash converter as in the prior art, MN analog-to-digital converters of successive binary approximation type sampling baseband symbol coded signal on an MN-phase basis to provide a respective digital output signal, each of which sampling phases is of one-$M^{th}$ symbol time duration, M being a positive integer at least one and N being a positive integer more than one. In a digital television signal receiver for ATSC standard signals, N is twelve. Equalization filtering is carried forward on an MN-phase basis, with output signals from N of the phases being supplied to N trellis decoders as their respective input signals. Selecting M to be two facilitates symbol synchronization using first and second N-phase match filters for a prescribed pseudo-noise sequence in the data field synchronization codes. The first match filter responds to the digital output signals of the oddly ordinally numbered ones of the 2N analog-to-digital converters as equalized by the 2N-phase equalization filter; and the second match filter responds to the digital output signals of the evenly ordinally numbered ones of the 2N analog-to-digital converters as equalized by the 2N-phase equalization filter. A symbol synchronizer responds to differences in those match filter responses for adjusting the phase of sampling by the 2N analog-to-digital converters of successive binary approximation type.

24 Claims, 5 Drawing Sheets

DIGITAL TV RECEIVERS WITH POLY-PHASE ANALOG-TO-DIGITAL CONVERSION OF BASEBAND SYMBOL CODING

The invention relates to digital television receivers and, more particularly, to analog-to-digital conversion and equalization filtering that are carried out in digital television receivers prior to symbol decoding.

BACKGROUND OF THE INVENTION

A Digital Television Standard published 16 Sep. 1995 by the Advanced Television Subcommittee (ATSC) specifies vestigial sideband (VSB) signals for transmitting digital television (DTV) signals in 6-MHz-bandwidth television channels such as those currently used in over-the-air broadcasting of National Television Subcommittee (NTSC) analog television signals within the United States.

Symbol decoding in digital television receivers is effected by a procedure known as "data slicing". Data slicing can be carried out using an analog bin comparator responsive to the amplitude of symbol coding as synchrodyned to baseband in the analog realm, with the bin numbers being sampled at symbol rate in optimum phasing. It is expected, however, that in most DTV receivers data slicing will be carried out in the digital realm, using a digital bin comparator responsive to the digitized amplitude of symbol coding as synchrodyned to baseband either before or after digitization. The invention concerns circuitry related to data slicing performed in the digital realm, which type of data slicing is preferable in digital television receivers. This is because filtering of the symbol coding is generally necessary in order to provide amplitude and phase equalization (and in the case of over-the-air reception to correct for multipath problems), and these types of filtering are better realized in the digital realm.

The rate at which analog-to-digital conversion must be carried out in a digital television receiver is generally at least twice the 10.76 million samples per second symbol rate. The common practice has been to use a type of analog-to-digital converter (ADC) referred to as a "flash converter" when arranging for digital operation in an NTSC analog television signal receiver, usually using sample rates (such as 14.32 million samples per second) harmonically related to color subcarrier. The bit resolution afforded by these flash converters is typically eight to ten bits. This experience tends to bias a television receiver designer towards the use of flash converters in digital television receivers for use with the ATSC standard. The flash or parallel analog-to-digital converter uses ($2^N$–1) comparators and a resistive ladder with ($2^N$–1) taps to achieve N bits resolution. There is a considerable amount of hardware in the flash converter, and it consumes considerable power. The justification for the use of the flash converter is its capability for providing high analog-to-digital conversion rate on a continuing basis, without the need for oversampling. Oversampling at larger multiples of 10.76 million samples per second is difficult to do; this makes oversampling analog-to-digital converters such as sigma-delta converters unattractive to operate at sampling rates greater than 10.76 million samples per second. The use of multiple-phase analog-to-digital conversion using a plurality M in number of ADCs of successive binary approximation type has been rejected in analog television receiver design owing to the difficulties in matching the individual analog-to-digital conversion characteristics of the ADCS.

The ATSC standard grew out of earlier proposals by Zenith Electronics Corporation for designing a digital high-definition television (HDTV) signal from which co-channel interfering NTSC analog TV signal could be removed by comb filtering using 12-sample differential delay. Zenith proposed precoding at the DTV transmitter to complement postcoding caused by such comb filtering in the DTV receiver. The signal to be symbol coded was subjected to 12-independent-paths trellis coding, so that comb filtering would not affect the independence of the trellis coding paths. This trellis coding scheme persists in the current ATSC standard, even though the standard no longer provides for precoding at the DTV transmitter to complement comb filtering using 12-sample differential delay in the DTV receiver. The inventor has the insight that the 12-independent-paths trellis coding, which provides for the operation of twelve trellis decoders independently from each other, can be exploited to avoid the difficulties in matching the individual analog-to-digital conversion characteristics of a plurality M in number of ADCs of successive binary approximation type, used for implementing multiple-phase analog-to-digital conversion.

The DTV receivers Zenith provided for field testing the ATSC standard used a single analog-to-digital converter, presumably a flash converter, for digitizing symbol coding for application to a single-path equalization filter and a single-path baseband phase-corrector (or symbol synchronizer). The equalized and phase-corrected symbols were then supplied to a de-interleaver for separating the twelve time-interleaved independent trellis codes to their respective trellis decoders. Following trellis decoding, the twelve data bit substreams were interleaved by an interleaver to supply a bit stream to byte-building circuitry for supplying bytes of Reed-Solomon code to a Reed-Solomon error correcting circuitry. U.S. Pat. No. 5,636,251 issued 3 Jun. 1997 to R. W. Citta et alii, entitled RECEIVER FOR A TRELLIS CODED DIGITAL TELEVISION SIGNAL, and incorporated herein by reference is descriptive of such DTV receiver construction.

Skilled digital filter designers are aware of the concept of poly-phase filtering and know in a general way that single-phase filters with high sample clockthrough rates can often be replaced by N-phase filters with clockthrough rates N times lower. Replacing the single-phase equalization filter and single-phase baseband phase-corrector by 12-phase filtering eliminates the need for a de-interleaver for applying the twelve-time-interleaved independent trellis codes to their respective trellis decoders, the inventor discerns. Furthermore, rather than using a de-interleaver between a flash converter and the 12-phase filtering used for equalization and symbol synchronization, the inventor discerns that the single flash converter can be replaced by twelve ADCs of successive binary approximation type arranged for staggered sampling to provide twelve-phase analog-to-digital conversion with up to eleven or twelve bits resolution without need for clock rates above DTV symbol rate. The match filtering used to recover response to data field synchronizing codes and data segment synchronizing codes can also be performed on a poly-phase basis, without need for a flash converter.

Alternatively, replacing the single-phase equalization filter and single-phase baseband phase-corrector by degenerate 24-phase filtering with twelve output ports also eliminates the need for a de-interleaver for applying the twelve-time-interleaved independent trellis codes to their respective trellis decoders, the inventor discerns. Rather than using a de-interleaver between a flash converter and this degenerate 24-phase filtering, the single flash converter can be replaced by twenty-four ADCs of successive binary approximation type arranged for staggered sampling to provide 24-phase analog-to-digital conversion. The 2:1 oversampling by the twenty-four ADCs of successive binary approximation type followed by 24-phase equalization filtering simplifies phase-corrector design, as compared to using only twelve ADCs of successive binary approximation type followed by 12-phase equalization filtering, the inventor points out.

Clockthrough rate of each ADC is one-twenty-fourth the 21.52, 32.28 or 43.04 million samples per second rate that would be typically used with the flash converter, which tends to reduce power consumption by the square of twenty-four in each ADC with an overall reduction of power consumption by a factor of twenty-four. Each ADC of successive binary approximation type has only one to twelve comparators therein depending on the specific type of ADC being used, this is no more than the $2^8$ comparators used in a flash converter with 8-bit resolution and is far less than the $2^{10}$ to $2^{12}$ comparators used in flash converters of 10-bit to 12-bit resolution. The twenty-four ADCs of successive binary approximation type arranged for staggered sampling will usually take up less room on a monolithic integrated circuit die than even the flash converter with 8-bit resolution, because the resistive ladder used for voltage division in the flash converter takes up considerable room on the die.

Each phase of a poly-phase equalization filter will require as many multipliers as in a single-phase equalization filter, since samples from all phases may have to be combined in each phase of the filter in order to effect optimal equalization. Upon initial consideration this may lead a digital filter designer to reject the use of such equalization filtering as requiring excessive hardware. However, the multiplications in a 24-phase filter can each take place over an interval twenty-four times as long as the multiplications in a single-phase filter without pipeline data flow being compromised. Since symbol rate is 10.76 million symbols per second, sampling at rates more than a very few times symbol rate is impractical. So, in a single-phase equalization filter successive multiplications must commence within a single clock interval or at most a very few clock intervals and progress through a data pipeline without faltering. High-speed multiplication tends to expend considerable power, power consumption tending to go up as the square of speed. These considerations tend to force multiplications at 10.76 samples per second or multiples thereof to be done using respective read-only memories (ROMs) rather using digital multipliers constructed from logic elements. If there are no substantial restrictions on the ranges of multiplier and multiplicand signals or the products resulting therefrom, multiplier ROMs require many times more hardware than digital multipliers constructed from logic elements. Multiplications on 10-bit to 12-bit input signals can be performed in a 24-phase equalization filter by digital multipliers constructed from logic elements and operated at a clock rate reduced 24-fold. So, the hardware costs and power consumption of the 24-phase equalization filter operated at 445 kHz clock rate can compare favorably with a single-phase equalization filter operated at 10.76 million samples per second clock rate.

Rather than using a 24-phase equalization filter after the twenty-four ADCs of successive binary approximation type, the output results of the ADCs can be converted to parallel-bit form and time-interleaved for application to a single-phase equalization filter as its input signal, the inventor points out. The equalized response from the single-phase equalization filter must be supplied to a de-interleaver for separating input signals to the twelve trellis decoders. This alternative construction of the digital television receiver retains the advantage of reduced power consumption in analog-to-digital conversion, the inventor points out.

SUMMARY OF THE INVENTION

The invention is embodied in a digital television signal receiver including circuitry for converting a received digital television signal to baseband symbol coded signal; a plurality N in number of trellis decoders supplying respective trellis decoding results; circuitry for assembling the respective trellis decoding results into a forward error-correction code; and a forward error-correction decoder responsive to said forward error-correction code for supplying a data stream portions of which are descriptive of television images. In a digital television signal receiver for receiving digital television signals transmitted in accordance with the ADC standard, N is twelve, the forward error-correction code is a one-dimensional Reed-Solomon code, and the forward error-correction decoder is a Reed-Solomon decoder. A digital television signal receiver embodying the invention characteristically includes, instead of a single flash converter as in prior-art digital television receivers, MN analog-to-digital converters of successive binary approximation type sampling baseband symbol coded signal on an MN-phase basis to provide a respective digital output signal, each of which sampling phases is of one-$M^{th}$ symbol time duration, M being a positive integer at least one. The MN analog-to-digital converters are identifiable by consecutive ordinal numbers first through $MN^{th}$, inclusive, assigned in order of their successive input sampling. An equalization filter responds to the output signals of the MN analog-to-digital converters to supply equalized input signals to the N trellis decoders.

A digital television signal receiver embodying the invention in preferred form characteristically includes, instead of a single flash converter as in prior-art digital television receivers, 2N analog-to-digital converters of successive binary approximation type sampling baseband symbol coded signal on an 2 N-phase basis to provide a respective digital output signal, each of which sampling phases is of one-half symbol time duration. The receiver also characteristically includes a 2 N-phase filter responsive to the digital output signals of the 2N analog-to-digital converters received as respective input signals thereto, connected for applying N output signals to the N trellis decoders as their respective input signals, the 2 N-path filter being an adaptive filter for providing equalization to the digital output signals of the 2N analog-to-digital converters, connected for generating de-interleaved baseband symbol coding without employing the de-interleaver of prior-art digital television receivers. The receiver further characteristically includes first and second N-phase match filters for a prescribed pseudo-noise sequence and a symbol synchronizer that responds to differences in those match filter responses for adjusting the phase of sampling by the 2N analog-to-digital converters of successive binary approximation type. The first match filter responds to the digital output signals of the oddly ordinally numbered ones of the 2N analog-to-digital converters as equalized by the 2 N-phase equalization filter; and the second match filter responds to the digital output signals of the evenly ordinally numbered ones of the 2N analog-to-digital converters as equalized by the 2 N-phase equalization filter.

DETAILED DESCRIPTION OF THE PREFERRED EMBODIMENT

Figure 1:
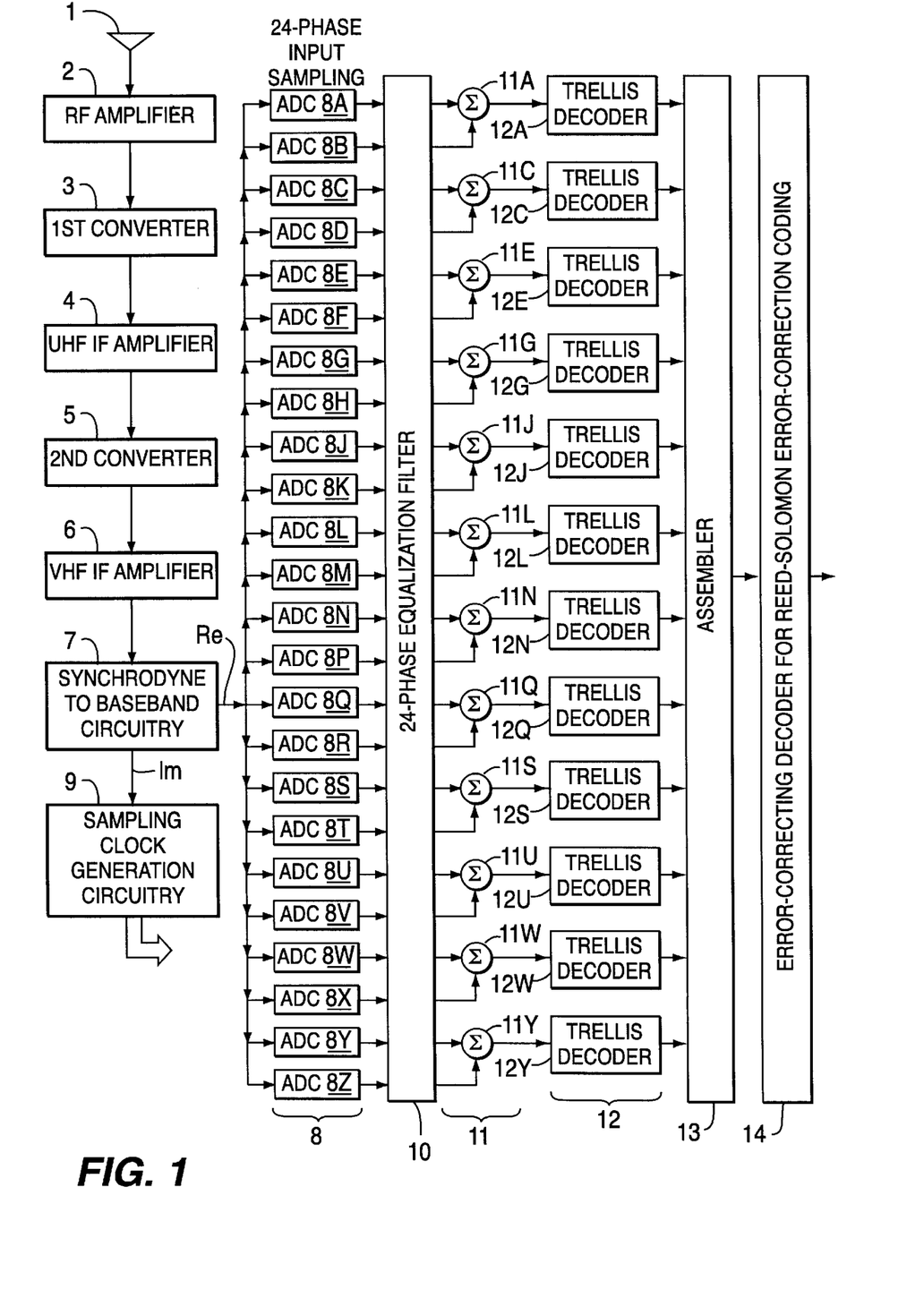
FIG. 1 is a schematic diagram of a portion of a digital television receiver, which portion extends from the receiving antenna to the Reed-Solomon decoder and embodies the invention in certain of its aspects.

Symbol coding is recovered at baseband by known circuitry depicted in the portion of a digital television receiver shown in FIG. 1 as being of the following plural-conversion type. A selected one of DTV signals as from a receiving antenna 1, for example, is received for amplification by a radio-frequency amplifier 2. Amplified DTV signal from the RF amplifier 2, which is still at frequencies within a channel allocated for television broadcasting, is converted by an upconverter 3 to first intermediate frequency signal in a portion of the ultra-high-frequency (UHF) band somewhat above the portion of that band allocated for television broadcasting. The RF amplifier 2 and the upconverter 3 have adjustable tuning and together function as a tuner for selecting a digital television signal from one of channels at different locations in a frequency band allocated for television broadcasting. A UHF intermediate-frequency amplifier 4 selectively amplifies the first intermediate frequency signal for application to a downconverter 5 responding with second intermediate frequency signal in a portion of the very-high-frequency (VHF) band somewhat below the portion of that band allocated for television broadcasting. A VHF intermediate-frequency amplifier 6 selectively amplifies the second intermediate frequency signal for application to circuitry 7 for synchrodyning the twice-converted DTV signal to baseband and thereby recovering symbol coding at baseband. The synchrodyning circuitry 7 includes an in-phase synchronous detector, a quadrature-phase synchronous detector, and a controlled oscillator supplying synchrodyning signals to the synchronous detectors (none of which elements are explicitly shown in FIGS. 1 or 2). The quadrature-phase synchronous detector provides an imaginary component Im of synchrodyne response, which component is used for developing automatic frequency and phase control (AFPC) signal for the controlled oscillator supplying synchrodyning signals to the synchronous detectors. The in-phase synchronous detector detects the vestigial-sideband amplitude-modulation of the data carrier to provide a real component Re of synchrodyne response, which component is descriptive of baseband symbol coding and is supplied from the synchrodyning circuitry 7 for analog-to-digital conversion. Alternatively, symbol coding is recovered at baseband by other known radio reception circuitry of single-conversion type.

In the portion of a digital television receiver shown in FIG. 1, rather than symbol coding supplied from the synchrodyning circuitry 7 being digitized by a flash converter as in the prior art, the symbol coding is digitized by a plurality 8 of analog-to-digital converters, each of successive binary approximation type. The input sampling of the symbol coding by the various ones 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z of this plurality 8 of ADCs takes place in successive ones of sample clock intervals, each of which sample clock intervals has a duration half as long as a symbol code symbol.

Sampling clock generation circuitry 9 supplies clocking for the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z. The connections for doing this are not explicitly shown in FIGS. 1 or 2, so as not to clutter the drawing and make it difficult to understand, but are readily designed by a skilled digital electronics designer. Also, the exact natures of these connections depend on the specific design of the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z with regard to the way successive binary sampling is carried out. The synchrodyning circuitry 7 is shown supplying the imaginary component Im of synchrodyne response to the sampling clock generation circuitry 9 for implementing the determination of sample clock frequency. The imaginary component Im of synchrodyne response is substantially free of direct component resulting from synchronous detection of pilot carrier in the DTV signal, so is preferred for squaring to generate a signal from which symbol frequency can be extracted by narrowband filtering. As will be explained in more detail further on in this specification, symbol synchronization is carried out by adjusting the phase of the sample clock so that each consecutive pair of sample clock intervals concurs with a respective symbol in the symbol coding.

The conversion results from the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z are applied as the input signal to a 24-phase equalization filter 10. Bit-serial to parallel-bit conversion of the successive binary approximation analog-to-digital conversion results from the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z is done at the outputs of these ADCs, and the filter 10 is constructed to operate with parallel-bit arithmetic. (Alternatively, the conversion results are supplied in bit-serial form to the 24-phase equalization filter 10, the filter 10 is constructed in bit-serial form for operation using serial-bit arithmetic, and bit-serial to parallel-bit conversion is carried out after the filter 10 prior to trellis decoding.)

The 24-phase equalization filter 10 forms the leading portion of a degenerate 24-phase filter, the trailing portion 11 of which comprises twelve digital adders 11A, 11C, 11E, 11G, 11J, 11L, 11N, 11Q, 11S, 11U, 11W, 11Y connected for supplying their respective sum signals to a plurality 12 of trellis decoders. The adder 11A adds together the equalized responses of the ADCs 8A and 8B to provide input signal for the trellis coder 12A; so, far as the trellis coder 12A is concerned, the ADCs 8A and 8B and their respective phases of the 24-phase equalization filter 10 in effect operate as a single ADC followed by a respective phase of a 12-phase equalization filter, with that single ADC performing input sampling in a respective one of the twelve phases. The adder 11C adds together the equalized responses of the ADCs 8C and 8D to provide input signal for the trellis coder 12C; so., far as the trellis coder 12C is concerned, the ADCs 8C and 8D and their respective phases of the 24-phase equalization filter 10 in effect operate as a single ADC followed by a respective phase of a 12-phase equalization filter, with that single ADC performing input sampling in a respective one of the twelve phases. The adder 11E adds together the equalized responses of the ADCs 8E and 8F to provide input signal for the trellis coder 12E; so, far as the trellis coder 12E is concerned, the ADCs 8E and 8F and their respective phases of the 24-phase equalization filter 10 in effect operate as a single ADC followed by a respective phase of a 12-phase equalization filter, with that single ADC performing input sampling in a respective one of the twelve phases. The adder 11G adds together the equalized responses of the ADCs 8G and 8H to provide input signal for the trellis coder 12G; so, far as the trellis coder 12G is concerned, the ADCs 8G and 8H and their respective phases of the 24-phase equalization filter 10 in effect operate as a single ADC followed by a respective phase of a 12-phase equalization filter, with that single ADC performing input sampling in a respective one of the twelve phases. The adder 11J adds together the equalized responses of the ADCs 8J and 8K to provide input signal for the trellis coder 12J; so, far as the trellis coder 12J is concerned, the ADCs 8J and 8K and their respective phases of the 24-phase equalization filter 10 in effect operate as a single ADC followed by a respective phase of a 12-phase equalization filter, with that single ADC performing input sampling in a respective one of the twelve phases. The adder 11L adds together the equalized responses of the ADCs 8L and 8M to provide input signal for the trellis coder 12L; so, far as the trellis coder 12L is concerned, the ADCs 8L and 8M and their respective phases of the 24-phase equalization filter 10 in effect operate as a single ADC followed by a respective phase of a 12-phase equalization filter, with that single ADC performing input sampling in a respective one of the twelve phases. The adder 11N adds together the equalized responses of the ADCs 8N and 8P to provide input signal for the trellis coder 12N; so, far as the trellis coder 12N is concerned, the ADCs 8N and 8P and their respective phases of the 24-phase equalization filter 10 in effect operate as a single ADC followed by a respective phase of a 12-phase equalization filter, with that single ADC performing input sampling in a respective one of the twelve phases. The adder 11Q adds together the equalized responses of the ADCs 8Q and 8R to provide input signal for the trellis coder 12Q, so, far as the trellis coder 12Q is concerned, the ADCs 8Q and 8R and their respective phases of the 24-phase equalization filter 10 in effect operate as a single ADC followed by a respective phase of a 12-phase equalization filter, with that single ADC performing input sampling in a respective one of the twelve phases. The adder 11S adds together the equalized responses of the ADCs 8S and 8T to provide input signal for the trellis coder 12S; so, far as the trellis coder 12S is concerned, the ADCs 8S and 8T and their respective phases of the 24-phase equalization filter 10 in effect operate as a single ADC followed by a respective phase of a 12-phase equalization filter, with that single ADC performing input sampling in a respective one of the twelve phases. The adder 11U adds together the equalized responses of the ADCs 8U and 8V to provide input signal for the trellis coder 12U; so, far as the trellis coder 12U is concerned, the ADCs 8U and 8V and their respective phases of the 24-phase equalization filter 10 in effect operate as a single ADC followed by a respective phase of a 12-phase equalization filter, with that single ADC performing input sampling in a respective one of the twelve phases. The adder 11W adds together the equalized responses of the ADCs 8W and 8X to provide input signal for the trellis coder 12W; so, far as the trellis coder 12W is concerned, the ADCs 8W and 8X and their respective phases of the 24-phase equalization filter 10 in effect operate as a single ADC followed by a respective phase of a 12-phase equalization filter with that single ADC performing input sampling in a respective one of the twelve phases. The adder 11Y adds together the equalized responses of the ADCs 8Y and 8Z to provide input signal for the trellis coder 12Y; so, far as the trellis coder 12Y is concerned, the ADCs 8Y and 8Z and their respective phases of the 24-phase equalization filter 10 in effect operate as a single ADC followed by a respective phase of a 12-phase equalization filter, with that single ADC performing input sampling in a respective one of the twelve phases.

The trellis decoders 12A, 12C, 12E, 12G, 12J, 12L, 12N, 12Q, 12S, 12U, 12W, 12Y in the plurality 12 are of a known form, such as one of those described in U.S. Pat. No. 5,636,251. The trellis coders can be of a type that uses "soft" decoding, such as described by Viterbi, or can be of a type that uses "hard" decoding using data-slicers with fixed boundary values. The trellis decoders 12A, 12C, 12E, 12G, 12J, 12L, 12N, 12Q, 12S, 12U, 12W, 12Y supply their respective trellis decoding results to an assembler 13. The assembler 13 interleaves the trellis decoding results and builds bytes from the interleaved trellis decoding results for application to an error-correcting Reed-Solomon decoder 14. Error-corrected data are supplied from the Reed-Solomon decoder 14 to the remaining portions of the DTV signal receiver, which are not shown in FIG. 1.

Plural-phase analog-to-digital conversion using a plurality of ADCs cyclically operated and sampling input signal on a time-division-multiplex basis normally has problems with matching the conversion characteristics of the ADCs and gating their inputs at regular intervals in order to avoid the introduction of pattern noise. The visibility of such pattern noise in images recovered from analog video signals that have been digitized in this way is a reason that a single flash converter is preferably used for digitizing analog video signals. DTV signals do not map into images on a viewscreen in such direct way that pattern noise is evident in images as viewed by a human being, of course. However, pattern noise as a source of error in recovering data is not a significant problem either, because of certain characteristics of the DTV receiver construction per FIG. 1. Unless ghosting is severe, most of the energy in the input signal of each one of the trellis decoders 12A, 12C, 12E, 12G, 12J, 12L, 12N, 12Q, 12S, 12U, 12W, 12Y originates in only two of the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z. Moreover, if it is arranged for the weights in each of the individual phases of the 24-phase equalization filter 10 to be adjusted independently of the adjustments of weights in the other phases, the adaptive filtering provided by the 24-phase equalization filter 10 inherently corrects the pattern noise generated by the plurality 8 of ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z before it is applied to the trellis decoders 12A, 12C, 12E, 12G, 12J, 12L, 12N, 12Q, 12S, 12U, 12W, 12Y.

The design of the 24-phase equalization filter 10 can take a variety of forms as those skilled in the art of equalizer design know. However some observations concerning preferable approaches to design are offered. An equalization filter can be constructed as a finite-impulse-response (FIR) digital filter with a long kernel, but the kernel becomes quite long if multipath terms exhibiting many symbol intervals of delay are to be suppressed. Consequently, equalization filters often are constructed as a cascade of a finite-impulse-response (FIR) digital filter used to suppress short-delay multipath terms and an infinite-impulse-response (IIR) digital filter used to suppress long-delay multipath terms. Such an IIR filter has a large number of zero weighting coefficients, and is better placed late in the cascade, if it is used. FIR filters with kernels having few zero terms, which appear in each of the twenty-four phases of preferred constructions of the 24-phase equalization filter 10 are preferably of the inverse canonic form in which samples are weighted before being delayed and combined with other weighted samples. An ADC of successive binary approximation type initially generates its conversion results in serial-bit format, and these serial-bit conversion results are suitable for direct admission into a digital multiplier apparatus as a digital multiplier signal to multiply a weighting coefficient multiplicand stored in an icand register.

Figure 2:
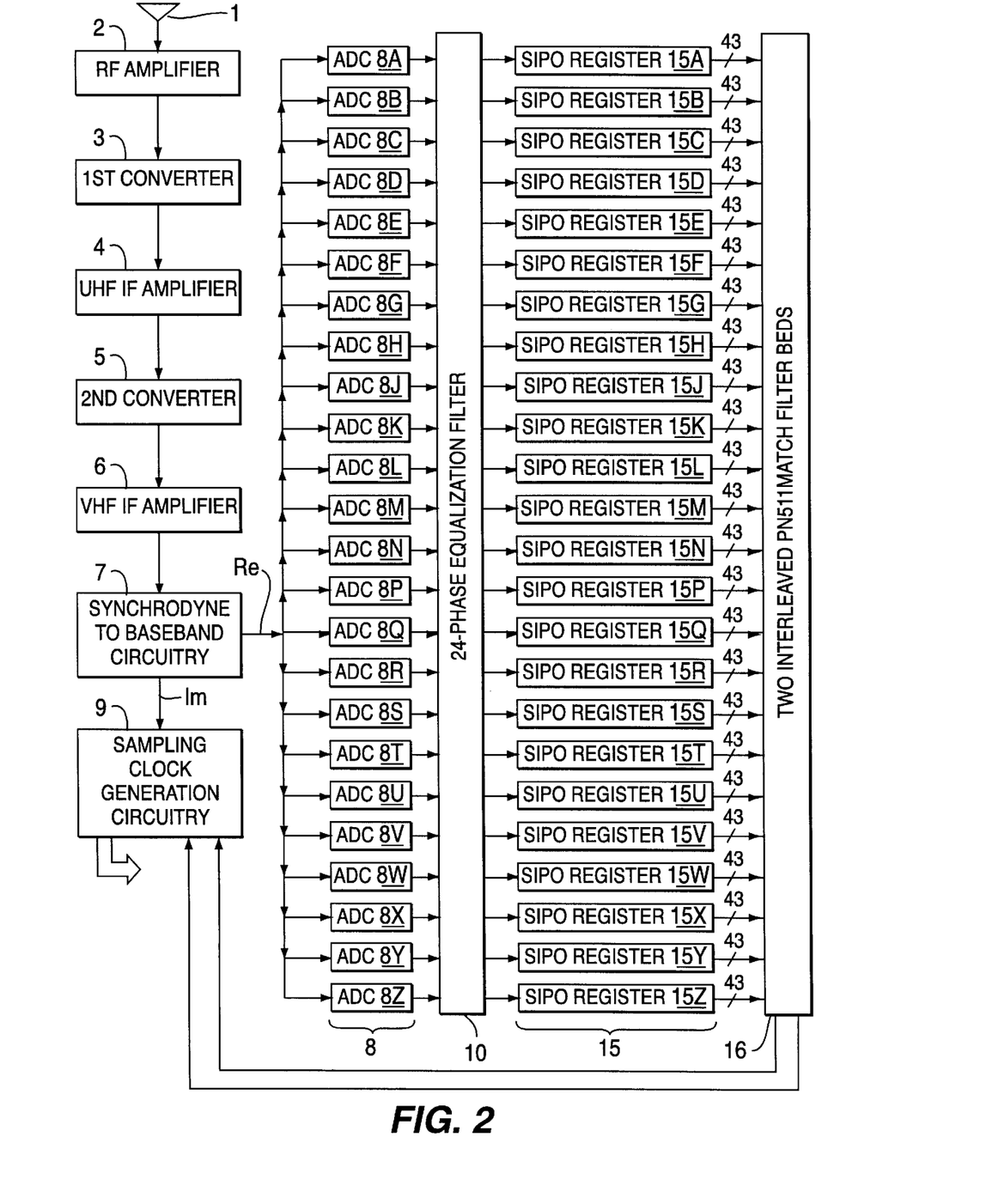
FIG. 2 is a schematic diagram of another portion of the digital television receiver depicted in part in FIG. 1, illustrating how symbol synchronization is preferably effected in a further aspect of the invention.

FIG. 2 shows details concerning how symbol synchronization is done in the portion of the DTV receiver shown generally in FIG. 1. The twenty-four output signals from the equalization filter 10 are supplied to respective ones 15A, 15B, 15C, 15D, 15E, 15F, 15G, 15H, 15J, 15K, 15L, 15M, 15N, 15P, 15Q, 15R, 15S, 15T, 15U, 15V, 15W, 15X, 15Y, 15Z of a plurality 15 of serial-in/parallel-out registers, the output signals from which are supplied to a pair 16 of filter beds that map two interleaved-in-time PN511 sequences. Each filter bed of the pair 16 is a weighted summation network, as can be constructed from simple adders, and supplies its respective weighted summation response to sampling clock generation circuitry 9 to adjust the phase of the sample clock timing input sampling by the ADCs 8A, 8B, 8C, 8D, 8E, 8F, 8G, 8H, 8J, 8K 8L, 8M, 8N, 8P, 8Q, 8R, 8S, 8T, 8U, 8V, 8W, 8X, 8V, 8Z. Supposing that correct symbol synchronization obtains, a first filter bed of the pair 16 generates an advanced-phase or leading match filter response, and a second filter bed of the pair 16 generates a retarded-phase or trailing match filter response one half symbol period later in time. These match filter responses pulse high when the PN511 sequence occurs in the field synchronization data segment of each data field of the DTV signal. When symbol synchronization is correct, theoretically both responses pulse equally high responsive to the PN511 sequence occurring in the field synchronization data segment, this pulse occurring during just one half-symbol period. When symbol phase is advanced from correct symbol synchronization, the advanced-phase or leading match filter response still pulses as narrow and high as during correct symbol synchronization, but the retarded-phase or trailing match filter response pulses only to reduced heights during two consecutive half-symbol periods. When symbol phase is retarded from correct symbol synchronization, the retarded-phase or trailing match filter response still pulses as narrow and high as during correct symbol synchronization, but the advanced-phase or leading match filter response pulses only to reduced heights during two consecutive half-symbol periods.

Figure 3:
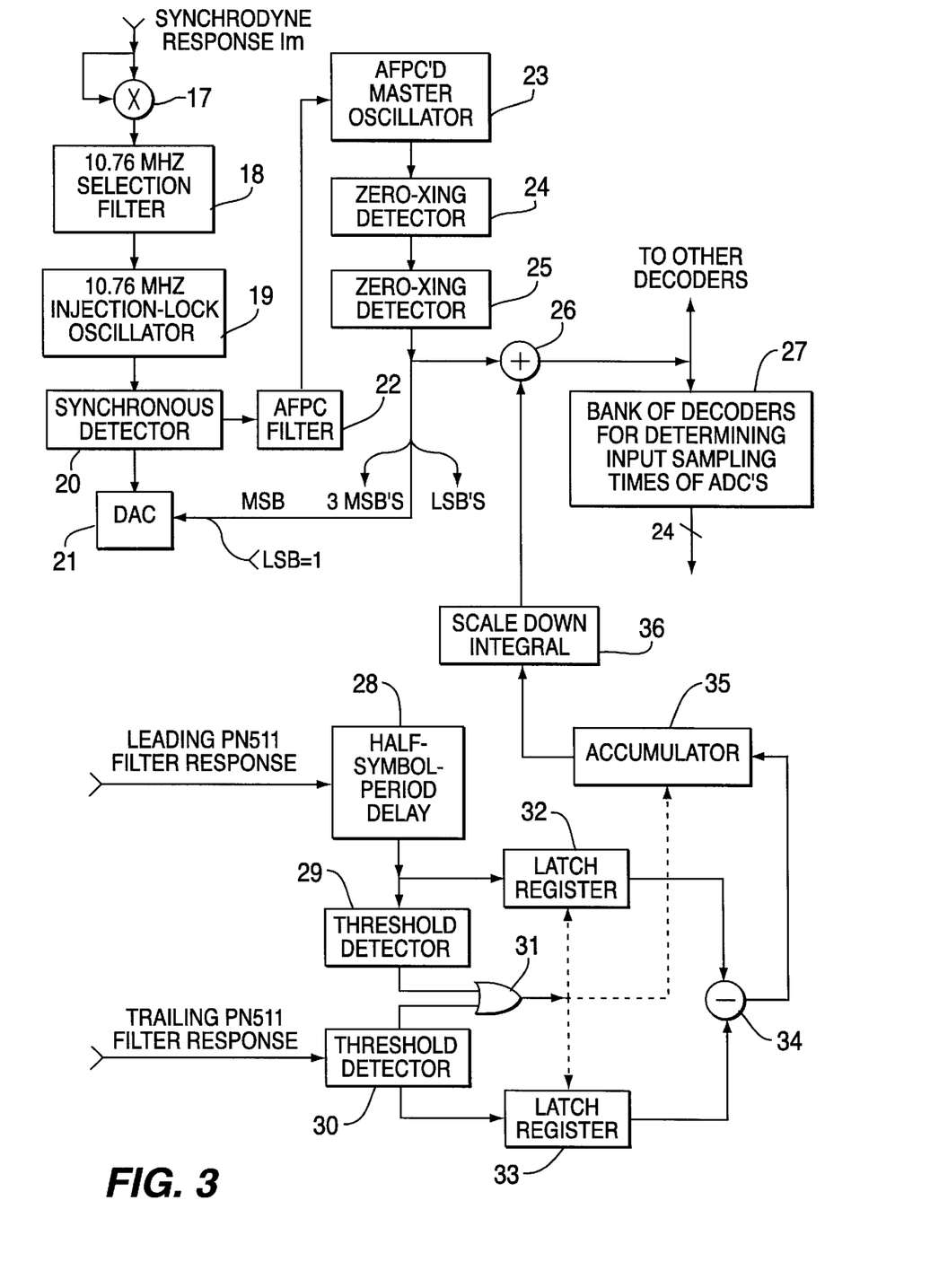
FIG. 3 is a schematic diagram of sampling clock generation circuitry that is preferred to be used in the portions of the digital television receiver depicted in FIGS. 1 and 2.

FIG. 3 shows a specific, currently preferred embodiment of the sampling clock generation circuitry 9 shown generally in FIGS. 1 and 2. The imaginary component Im of synchrodyne response supplied at baseband from the synchrodyne circuitry 7 is supplied both as multiplicand input and as multiplier input to a two- or four-quadrant analog multiplier 17 for squaring. An analog bandpass filter 18 extracts 10.76 MHz energy at symbol frequency from the resulting product that the multiplier 17 supplies. This energy is injected into an injection-lock oscillator 19 which responds to supply sustained 10.76 MHz oscillations of substantially constant amplitude to a synchronous detector 20 as a reference carrier for heterodyning with the response of a digital-to-analog converter 21. The response of the synchronous detector 20 is lowpass filtered by a filter 22 to generate an automatic frequency and phase control (AFPC) signal for a master clock oscillator 23 oscillating at a high harmonic of 10.76 MHz the frequency of which is an integral power of two times 10.76 MHz. The sixteenth harmonic of 10.76 MHz at 172.16 MHz is suitable, falling between the lower and upper VHF television broadcast bands, and having a second harmonic between the upper VHF television broadcast band and below the UHF television broadcast band. The master clock oscillator 23 is preferably a sinusoidal oscillator generating a sinusoidal output signal that is substantially single-frequency in character. A zero-crossing detector 24 detects average-axis crossings of this sinusoidal output signal, which detected crossings are then counted by a zero-crossing counter 25. The four most significant bits of the count from the zero-crossing counter 25 furnish binary-coded count to modulo twelve, used for symbol counting. This is most simply done by making the two most significant bits of the count furnish a binary coded count to modulo three and making the thirdmost and fourthmost significant bits of the count binary count to modulo four. The fourthmost significant bit of the count from the zero-crossing counter 25 toggles at a frequency that is nominally symbol frequency and is applied to the digital-to-analog converter 21 as a sign bit, together with a wired ONE as the less significant bit of a two-bit input signal to the DAC 21. This closes the AFPC feedback loop for the master clock oscillator 23, which regulates its frequency of oscillation to be a phase-locked harmonic of the 10.76 symbol frequency as recovered by elements 17–19.

The count from the zero-crossing counter 25 is applied as an addend to a digital adder 26, receiving a phase offset signal used for symbol synchronization as another addend and preserving modulo twelve wraparound in the four most significant bits of its sum output signal. The adder supplies its sum output signal to decoders for generating various clocking and timing signals used with digital operation, such as those used by the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z for clocking their respective operations. By way of example, FIG. 3 shows a bank 27 of decoders each responding to the count from the zero-crossing counter 25 to generate a respective gating signal for determining the time that a respective one of the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z performs its input signal sampling.

The phase offset signal applied to the digital adder 26 to implement symbol synchronization is derived in the following manner from the leading (advanced-phase) and trailing (retarded-phase) match filter responses supplied from the pair 15 of interleaved PN511 filter beds of FIG. 2. The leading PN511 match filter response is supplied to a delay circuit 28 to be delayed one-half symbol interval to align that response temporally with the trailing PN511 match filter response. The delay circuit 28 preferably provides clocked delay, by way of example being a clocked latch register. The resulting delayed leading PN5 11 match filter response is supplied to a threshold detector 29 which supplies logic output ONE when and only when that match filter response pulses above a prescribed threshold that is more than half the maximum height of that response, the logic output of the threshold detector 29 otherwise being ZERO. The resulting trailing to a threshold detector 30 which supplied to a threshold detector 30 which supplies logic output ONE when and only when that match filter response pulses above a prescribed threshold that is more than half the maximum height of that response, the logic output of the threshold detector 30 otherwise being ZERO. The threshold detectors 29 and 30 are preferably similar in construction and prescribed threshold. An OR gate 31 detects when one or both of the responses of the threshold detectors 29 and 30 pulses to ONE, generating a logic ONE response at such time and otherwise generating a logic ZERO response. Logic ONE response from the OR gate 31 commands a latch register 32 to update its temporarily stored contents with the current value of delayed leading PN511 match filter response supplied from the delay circuit 28. Logic ONE response from the OR gate 31 also commands a latch register 33 to update its temporarily stored contents with the current value of trailing PN511 match filter response. A subtractor 34 differentially combines the trailing PN511 match filter response temporarily stored in the latch register 33 with the leading PN511 match filter response temporarily stored in the latch register 32, supplying the resulting difference as input signal to an accumulator 35 for accumulation, which accumulation is clocked responsive to the OR gate 31 response returning to logic ZERO condition. The integral of error signal which is accumulated in the accumulator 35 is scaled down in its connection 36 to the digital adder 26 for applying the phase offset signal for implementing symbol synchronization. This scaling down is preferably accomplished by wired division or right shift.

The symbol synchronizing procedures described above are believed to be novel. The adjustment of symbol phase by adding phase offset to a count that wraps around, then decoding the sum to develop timing and clocking signals that can be advanced or retarded in time is advantageous in avoiding occasional symbol loss. Schemes that adjust symbol phasing solely through delay must experience a discontinuity at some point when adjusting between retarded symbol phasing and advanced symbol phasing, resulting in loss of a symbol.

In alternative embodiments of the invention, arrangements can be made to use PN63 signals, rather than PN511 signals, for symbol synchronization. Selection of the PN63 signals to be used for symbol synchronization introduces additional complication, and synchronization is somewhat less precise than with PN511 signals. For these reasons the inventor currently prefers embodiments of the invention that use PN511 signals for symbol synchronization.

Figure 4:
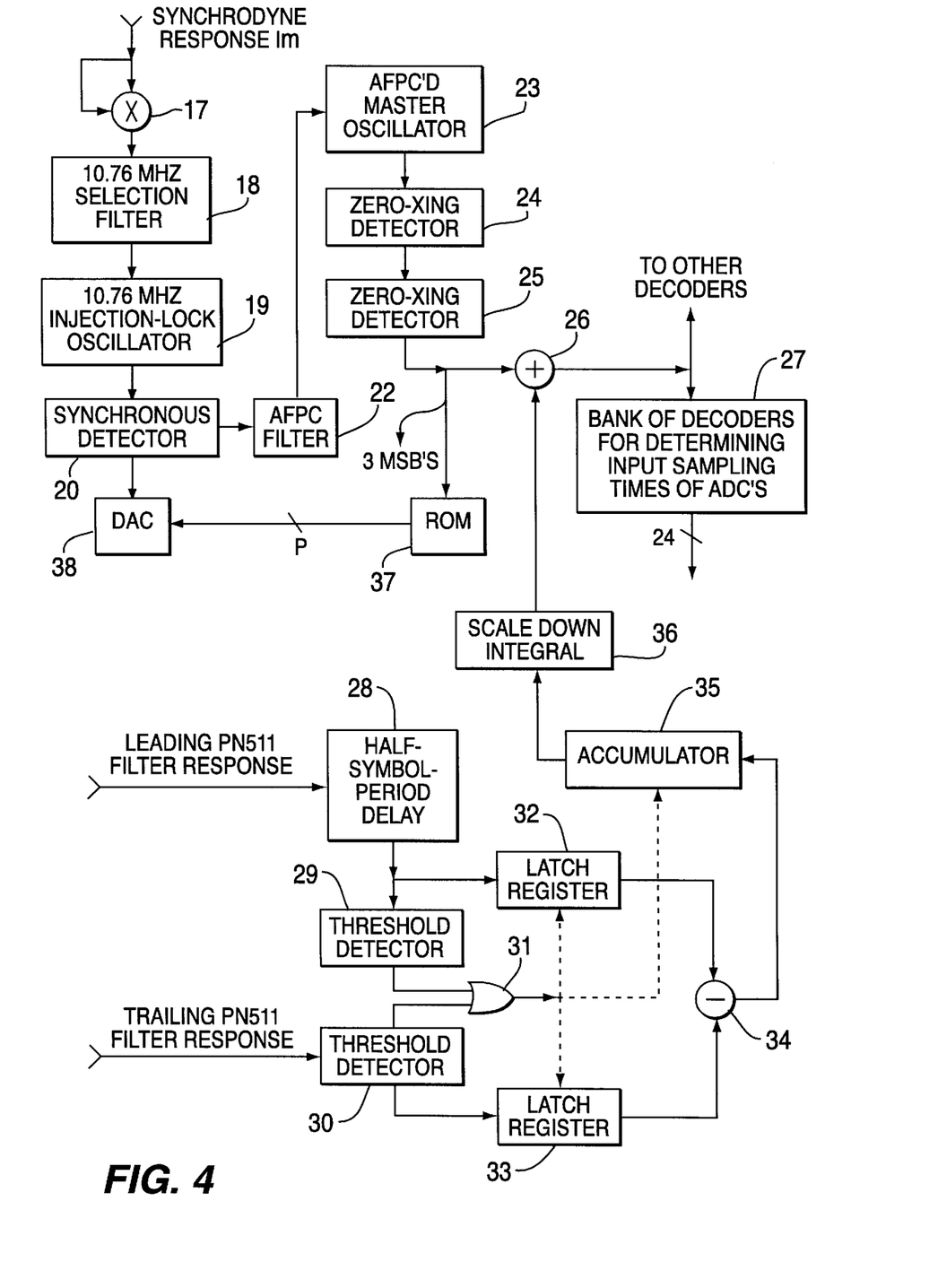
FIG. 4 is a schematic diagram of sampling clock generation circuitry that can be used in the portions of the digital television receiver depicted in FIGS. 1 and 2 instead of the FIG. 3 sampling clock generation circuitry.

FIG. 4 shows sampling clock generation circuitry that can be used instead of that of FIG. 3. In FIG. 3 the fourthmost significant bit of the count from the counter 25 is converted to a square-wave analog signal in the single-bit digital-to-analog converter 38 for application to the synchronous detector 20 as a description of the local oscillator signal to be AFPC'd. In FIG. 4 the fourthmost significant bit of the count from the counter 25 and less significant bits of that count are used to address a read-only memory 37 that supplies a plural-bit digital-to-analog converter 38 description of local oscillator signal to be AFPC'd in terms of digital samples thereof each having a plurality P in number of parallel bits. The local oscillator signal to be AFPC'd which is described by those digital signals can be such that the DAC 38 recovers a sinusoidal signal or recovers a triangular wave, by way of specific examples. Generally, the cut-off frequency of the AFPC filter 22 is so low in frequency that the local oscillator signal to be AFPC'd may as well be described as a square wave, which simplifies the hardware.

Modifications of the sampling clock generation shown in FIG. 3 are possible in which the real component Re of synchrodyne response supplied at baseband from the synchrodyne circuitry 7 is supplied both as multiplicand input and as multiplier input to the two- or four-quadrant analog multiplier 17 for squaring, either directly or after highpass filtering to remove direct and low-frequency components. Similar modifications of the sampling clock generation shown in FIG. 4 are possible. The advantage of squaring the imaginary component Im of synchrodyne response is that it has substantially no direct component to increase the dynamic range required of the multiplier.

Figure 5:
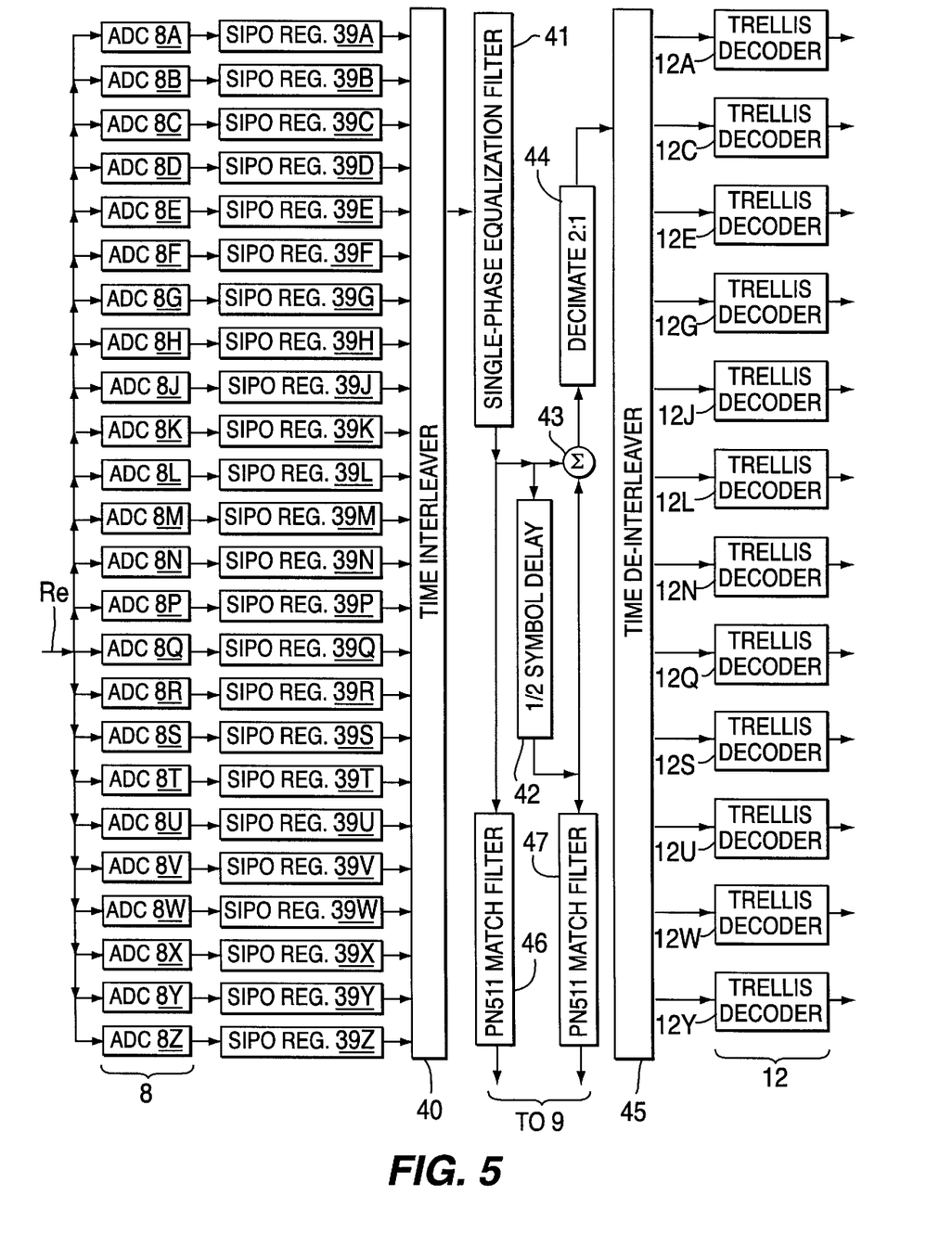
FIG. 5 is a schematic diagram of a modification of the portions of a digital television receiver shown in FIGS. 1 and 2, which portions of a digital receiver as so modified embody the invention in certain other of its aspects.

FIG. 5 is a schematic diagram of a modification of the portions of a digital television receiver shown in FIGS. 1 and 2, which replaces the 24-phase equalization filter 10 with other equalization circuitry. Respective serial-bit analog-to-digital conversion results from the ADCs 8A, 8B, 8C, 8D, 8E, 8F, 8G, 8H, 8J, 8K, 8L, 8M, 8N, 8P, 8Q, 8R, 8S, 8T, 8U, 8V, 8W, 8X, 8Y, 8Z are supplied to respective ones 39A, 39B, 39C, 39D, 39E, 39F, 39G, 39H, 39J, 39K, 39L, 39M, 39N, 39P, 39Q, 39R, 39S, 39T, 39U, 39V, 39W, 39X, 39Y, 39Z of a plurality 39 of serial-in/parallel-out registers operated as serial-bit to parallel-bit converters, the parallel-bit output signals from which are successively polled by a multiplexer 40 functioning as a time interleaver 40 to apply a continuous flow of parallel-bit data to a single-phase equalization filter 41 as input signal. Output samples from the phase equalization filter 41 are delayed a half symbol period in a delay circuit 42, and the resulting differentially delayed are summed in a digital adder 43 to supply input samples to a 2:1 decimator 44. The decimator 44 selects alternate input samples to time de-interleaver circuitry 45, which supplies 12-phase equalization filter response to the trellis decoders 12A, 12C, 12E, 12G, 12J, 12L, 12N, 12Q, 12S, 12U, 12W, 12Y. Output samples from the equalization filter 41 are supplied to the cascade connection of PN511 match filters 46 and 47, which supply leading (advanced-phase) and trailing (retarded-phase) match filter responses to the sampling clock generation circuitry 9, specific forms of which sampling clock generation circuitry are depicted in FIGS. 3 and 4.

Using the single-phase equalization filter 41, rather than a plural-phase equalization filter, means that there is no longer the possibility of compensating for individual variations among the plurality of ADCs as part of the equalization process. Since ADC characteristics can be reasonably well-matched, loss of this possibility generally can be tolerated. Using the single-phase equalization filter 41, rather than a plural-phase equalization filter, simplifies the equalization filter being followed in cascade by a filter for suppressing artifacts of NTSC co-channel interference, such as one of the filters described by the inventor in U.S. patent application Ser. No. 08/746,520 filed 12 Nov. 1996 or in U.S. patent application Ser. No. 08/839,691 filed 15 Apr. 1997, both of which applications are entitled DIGITAL TELEVISION RECEIVER WITH ADAPTIVE FILTER CIRCUITRY FOR SUPPRESSING NTSC CO-CHANNEL INTERFERENCE.

What is claimed is:

1. A digital television signal receiver comprising:

circuitry for converting a received digital television signal to baseband symbol coded signal;

a plurality N in number of trellis decoders supplying respective trellis decoding results;

circuitry for assembling said respective trellis decoding results into a forward error-correction code;

a forward error-correction decoder responsive to said forward error-correction code for supplying a data stream portions of which are descriptive of television images;

a plurality MN in number of analog-to-digital converters of successive binary approximation type sampling baseband symbol coded signal on an MN-phase basis to provide a respective digital output signal, each of which sampling phases is one-$M^{th}$ symbol time duration, M being a positive integer at least one and MN being the product of M times N, said MN analog-to-digital converters identifiable by consecutive ordinal numbers first through $MN^{th}$ assigned in order of their successive input sampling; and an equalization filter responsive to the digital output signals of said first through $MN^{th}$ analog-to-digital converters received as respective input signals thereto, for supplying N output signals to said N trellis decoders as their respective input signals, said equalization filter being an adaptive filter for equalizing said digital output signals of said MN analog-to-digital converters to condition said N trellis decoders for generating de-interleaved symbol decoding results.

2. The digital television signal receiver of claim 1, wherein said equalization filter comprises:

an MN-phase filter responsive to the digital output signals of said first through $MN^{th}$ analog-to-digital converters received as respective input signals thereto, said MN-phase filter connected for supplying N output signals to said N trellis decoders as their respective input signals, said MN-phase filter being an adaptive filter for equalizing said digital output signals of said MN analog-to-digital converters to condition said N trellis decoders for generating de-interleaved symbol decoding results.

3. The digital television signal receiver of claim 2, wherein M is two, further comprising:

a first N-phase match filter for a prescribed pseudo-noise sequence, said first match filter responding to the digital output signals of the oddly ordinally numbered ones of the 2N analog-to-digital converters as equalized by said MN-phase filter;

a second N-phase match filter for said prescribed pseudo-noise sequence, said second match filter responding to the digital output signals of the evenly ordinally numbered ones of the 2N analog-to-digital converters as equalized by said MN-phase equalization filter; and a symbol synchronizer that responds to differences in the responses of said first and second match filters for adjusting the phase of sampling by the 2N analog-to-digital converters of successive binary approximation type.

4. The digital television signal receiver of claim 3, wherein said prescribed pseudo-noise sequence is a PN511 sequence, as used in the field synchronization codes of broadcast digital television signals.

5. The digital television signal receiver of claim 3, further comprising:

circuitry for determining from said baseband symbol coded signal the symbol frequency thereof;

a master oscillator for supplying oscillations of a frequency and phase controlled by an automatic frequency and phase control signal;

a counter for counting zero-crossings of the oscillations of said master oscillator to generate a multiple-bit count;

a digital-to-analog converter for converting one of the bits of said multiple-bit count to a square wave of a frequency nominally the same as said symbol frequency;

a synchronous detector for generating said automatic frequency and phase control signal responsive to said square wave and to the symbol frequency of said baseband symbol coded signal as determined by said circuitry for determining from said baseband symbol coded signal the symbol frequency thereof;

an adder for combining said count with a phase offset signal supplied from said symbol synchronizer, thereby to generate an adjusted count; and decoders responsive to prescribed values of said adjusted count for generating timing signals for operating said plurality MN in number of analog-to-digital converters of successive binary approximation type.

6. The digital television signal receiver of claim 5, wherein said circuitry for determining from said baseband symbol coded signal the symbol frequency thereof comprises:

circuitry for squaring a component of said baseband symbol coded signal;

a narrow bandpass filter for extracting symbol frequency components from the resulting squared baseband symbol coded signal; and an injection-locked oscillator into which said symbol frequency components extracted by said narrowband pass filter are injected, for supplying oscillations of substantially constant amplitude at said symbol frequency for application to said synchronous detector.

7. The digital television signal receiver of claim 6, wherein said symbol synchronizer comprises:

circuitry for temporally aligning the responses of said first and second match filters;

first and second threshold detectors respectively responsive to the temporally aligned responses of said first and second match filters, with output signals logically combined for detecting when either of the temporally aligned responses of said first and second match filters is a substantial portion more than half of its maximum possible peak response;

a first latch register for temporarily storing the response of said first match filter, as temporally aligned with the response of said second match filter, in response to detecting either of the temporally aligned responses of said first and second match filters currently being a substantial portion more than half of its maximum possible peak response;

a second latch register for temporarily storing the response of said second match filter, as temporally aligned with the response of said first match filter, in response to detecting either of the temporally aligned responses of said first and second match filters currently being a substantial portion more than half of its maximum possible peak response;

a subtractor for differentially combining the responses of said first and second match filters as temporarily stored in said first and second latch registers to generate a difference signal as an output signal from said subtractor; and an accumulator for said difference signal, which supplies an accumulator output signal scaled for application to said adder as said phase offset signal.

8. The digital television signal receiver of claim 5, wherein said symbol synchronizer comprises:

circuitry for temporally aligning the responses of said first and second match filters;

first and second threshold detectors respectively responsive to the temporally aligned responses of said first and second match filters, with output signals logically combined for detecting when either of the temporally aligned responses of said first and second match filters is a substantial portion more than half of its maximum possible peak response;

a first latch register for temporarily storing the response of said first match filter, as temporally aligned with the response of said second match filter, in response to detecting either of the temporally aligned responses of said first and second match filters currently being a substantial portion more than half of its maximum possible peak response;

a second latch register for temporarily storing the response of said second match filter, as temporally aligned with the response of said first match filter, in response to detecting either of the temporally aligned responses of said first and second match filters currently being a substantial portion more than half of its maximum possible peak response;

a subtractor for differentially combining the responses of said first and second match filters as temporarily stored in said first and second latch registers to generate a difference signal as an output signal from said subtractor; and an accumulator for said difference signal, which supplies an accumulator output signal scaled for application to said adder as said phase offset signal.

9. The digital television signal receiver of claim 3, further comprising:

circuitry for determining from said baseband symbol coded signal the symbol frequency thereof;

a master oscillator for supplying oscillations of a frequency and phase controlled by an automatic frequency and phase control signal;

a counter for counting zero-crossings of the oscillations of said master oscillator to generate a multiple-bit count;

read-only memory addressed by bits of said multiple-bit count for generating a read-out signal having a repetition frequency nominally the same as said symbol frequency;

a digital-to-analog converter for converting the read-out signal from said read-only memory to an analog signal having a repetition frequency nominally the same as said symbol frequency;

a synchronous detector for generating said automatic frequency and phase control signal responsive to said analog signal and to the symbol frequency of said baseband symbol coded signal as determined by said circuitry for determining from said baseband symbol coded signal the symbol frequency thereof;

an adder for combining said count with a phase offset signal supplied from said symbol synchronizer, thereby to generate an adjusted count; and decoders responsive to prescribed values of said adjusted count for generating timing signals for operating said plurality MN in number of analog-to-digital converters of successive binary approximation type.

10. The digital television signal receiver of claim 9, wherein said circuitry for determining from said baseband symbol coded signal the symbol frequency thereof comprises:

circuitry for squaring a component of said baseband symbol coded signal;

a narrow bandpass filter for extracting symbol frequency components from the resulting squared baseband symbol coded signal; and an injection-locked oscillator into which said symbol frequency components extracted by said narrowband pass filter are injected, for supplying oscillations of substantially constant amplitude at said symbol frequency for application to said synchronous detector.

11. The digital television signal receiver of claim 10, wherein said symbol synchronizer comprises:

circuitry for temporally aligning the responses of said first and second match filters;

first and second threshold detectors respectively responsive to the temporally aligned responses of said first and second match filters, with output signals logically combined for detecting when either of the temporally aligned responses of said first and second match filters is a substantial portion more than half of its maximum possible peak response;

a first latch register for temporarily storing the response of said first match filter, as temporally aligned with the response of said second match filter, in response to detecting either of the temporally aligned responses of said first and second match filters currently being a substantial portion more than half of its maximum possible peak response;

a second latch register for temporarily storing the response of said second match filter, as temporally aligned with the response of said first match filter, in response to detecting either of the temporally aligned responses of said first and second match filters currently being a substantial portion more than half of its maximum possible peak response;

a subtractor for differentially combining the responses of said first and second match filters as temporarily stored in said first and second latch registers to generate a difference signal as an output signal from said subtractor; and an accumulator for said difference signal, which supplies an accumulator output signal scaled for application to said adder as said phase offset signal.

12. The digital television signal receiver of claim 9, wherein said symbol synchronizer comprises:

circuitry for temporally aligning the responses of said first and second match filters;

first and second threshold detectors respectively responsive to the temporally aligned responses of said first and second match filters, with output signals logically combined for detecting when either of the temporally aligned responses of said first and second match filters is a substantial portion more than half of its maximum possible peak response;

a first latch register for temporarily storing the response of said first match filter, as temporally aligned with the response of said second match filter, in response to detecting either of the temporally aligned responses of said first and second match filters currently being a substantial portion more than half of its maximum possible peak response;

a second latch register for temporarily storing the response of said second match filter, as temporally aligned with the response of said first match filter, in response to detecting either of the temporally aligned responses of said first and second match filters currently being a substantial portion more than half of its maximum possible peak response;

a subtractor for differentially combining the responses of said first and second match filters as temporarily stored in said first and second latch registers to generate a difference signal as an output signal from said subtractor; and an accumulator for said difference signal which supplies an accumulator output signal scaled for application to said adder as said phase offset signal.

13. The digital television signal receiver of claim 1, wherein each of said plurality MN in number of analog-to-digital converters of successive binary approximation type has a respective serial-bit to parallel-bit converter for its output signal.

14. The digital television signal receiver of claim 13, wherein said equalization filter comprises:
an interleaver for time-interleaving the output signals of said analog-to-digital converters of successive binary approximation type as converted to parallel-bit form;
a single-phase filter connected for supplying a response to the digital output signals of said first through $MN^{th}$ analog-to-digital converters as converted to parallel-bit form and then time interleaved by said interleaver, said single-phase filter being an adaptive filter for equalizing said digital output signals of said first through $MN^{th}$ analog-to-digital converters;
a de-interleaver for supplying respective input signals to ones of said plurality N in number of trellis decoders, as selected from said response of said single-phase filter.

15. The digital television signal receiver of claim 14, wherein M is two, further comprising:
a first match filter for a prescribed pseudo-noise sequence, said first match filter responding to the digital output signals of the oddly ordinally numbered ones of the 2N analog-to-digital converters as equalized by said single-phase filter;
a second match filter for said prescribed pseudo-noise sequence, said second match filter responding to the digital output signals of the evenly ordinally numbered ones of the 2N analog-to-digital converters as equalized by said single-phase equalization filter; and
a symbol synchronizer that responds to differences in the responses of said first and second match filters for adjusting the phase of sampling by the 2N analog-to-digital converters of successive binary approximation type.

16. The digital television signal receiver of claim 15, wherein said prescribed pseudo-noise sequence is a PN511 sequence, as used in the field synchronization codes of broadcast digital television signals.

17. The digital television signal receiver of claim 15, further comprising:
circuitry for determining from said baseband symbol coded signal the symbol frequency thereof;
a master oscillator for supplying oscillations of a frequency and phase controlled by an automatic frequency and phase control signal;
a counter for counting zero-crossings of the oscillations of said master oscillator to generate a multiple-bit count;
a digital-to-analog converter for converting one of the bits of said multiple-bit count to a square wave of a frequency nominally the same as said symbol frequency;
a synchronous detector for generating said automatic frequency and phase control signal responsive to said square wave and to the symbol frequency of said baseband symbol coded signal as determined by said circuitry for determining from said baseband symbol coded signal the symbol frequency thereof;
an adder for combining said count with a phase offset signal supplied from said symbol synchronizer, thereby to generate an adjusted count; and
decoders responsive to prescribed values of said adjusted count for generating timing signals for operating said plurality MN in number of analog-to-digital converters of successive binary approximation type.

18. The digital television signal receiver of claim 17, wherein said circuitry for determining from said baseband symbol coded signal the symbol frequency thereof comprises:
circuitry for squaring a component of said baseband symbol coded signal;
a narrow bandpass filter for extracting symbol frequency components from the resulting squared baseband symbol coded signal; and
an injection-locked oscillator into which said symbol frequency components extracted by said narrowband pass filter are injected, for supplying oscillations of substantially constant amplitude at said symbol frequency for application to said synchronous detector.

19. The digital television signal receiver of claim 18, wherein said symbol synchronizer comprises:
circuitry for temporally aligning the responses of said first and second match filters;
first and second threshold detectors respectively responsive to the temporally aligned responses of said first and second match filters, with output signals logically combined for detecting when either of the temporally aligned responses of said first and second match filters is a substantial portion more than half of its maximum possible peak response;
a first latch register for temporarily storing the response of said first match filter, as temporally aligned with the response of said second match filter, in response to detecting either of the temporally aligned responses of said first and second match filters currently being a substantial portion more than half of its maximum possible peak response;
a second latch register for temporarily storing the response of said second match filter, as temporally aligned with the response of said first match filter, in response to detecting either of the temporally aligned responses of said first and second match filters currently being a substantial portion more than half of its maximum possible peak response;
a subtractor for differentially combining the responses of said first and second match filters as temporarily stored in said first and second latch registers to generate a difference signal as an output signal from said subtractor; and
an accumulator for said difference signal, which supplies an accumulator output signal scaled for application to said adder as said phase offset signal.

20. The digital television signal receiver of claim 17, wherein said symbol synchronizer comprises:
circuitry for temporally aligning the responses of said first and second match filters;
first and second threshold detectors respectively responsive to the temporally aligned responses of said first and second match filters, with output signals logically combined for detecting when either of the temporally aligned responses of said first and second match filters is a substantial portion more than half of its maximum possible peak response;
a first latch register for temporarily storing the response of said first match filter, as temporally aligned with the response of said second match filter, in response to detecting either of the temporally aligned responses of said first and second match filters currently being a substantial portion more than half of its maximum possible peak response;

a second latch register for temporarily storing the response of said second match filter, as temporally aligned with the response of said first match filter, in response to detecting either of the temporally aligned responses of said first and second match filters currently being a substantial portion more than half of its maximum possible peak response;

a subtractor for differentially combining the responses of said first and second match filters as temporarily stored in said first and second latch registers to generate a difference signal as an output signal from said subtractor; and an accumulator for said difference signal, which supplies an accumulator output signal scaled for application to said adder as said phase offset signal.

21. The digital television signal receiver of claim 15, further comprising:

circuitry for determining from said baseband symbol coded signal the symbol frequency thereof;

a master oscillator for supplying oscillations of a frequency and phase controlled by an automatic frequency and phase control signal;

a counter for counting zero-crossings of the oscillations of said master oscillator to generate a multiple-bit count;

read-only memory addressed by bits of said multiple-bit count for generating a read-out signal having a repetition frequency nominally the same as said symbol frequency;

a digital-to-analog converter for converting the read-out signal from said read-only memory to an analog signal having a repetition frequency nominally the same as said symbol frequency;

a synchronous detector for generating said automatic frequency and phase control signal responsive to said analog signal and to the symbol frequency of said baseband symbol coded signal as determined by said circuitry for determining from said baseband symbol coded signal the symbol frequency thereof;

an adder for combining said count with a phase offset signal supplied from said symbol synchronizer, thereby to generate an adjusted count; and decoders responsive to prescribed values of said adjusted count for generating timing signals for operating said plurality MN in number of analog-to-digital converters of successive binary approximation type.

22. The digital television signal receiver of claim 21, wherein said circuitry for determining from said baseband symbol coded signal the symbol frequency thereof comprises:

circuitry for squaring a component of said baseband symbol coded signal;

a narrow bandpass filter for extracting symbol frequency components from the resulting squared baseband symbol coded signal; and an injection-locked oscillator into which said symbol frequency components extracted by said narrowband pass filter are injected for supplying oscillations of substantially constant amplitude at said symbol frequency for application to said synchronous detector.

23. The digital television signal receiver of claim 22, wherein said symbol synchronizer comprises:

circuitry for temporally aligning the responses of said first and second match filters;

first and second threshold detectors respectively responsive to the temporally aligned responses of said first and second match filters, with output signals logically combined for detecting when either of the temporally of said first and second match filters is a substantial portion more than half of its maximum possible peak response;

a first latch register for temporarily storing the response of said first match filter, as temporally aligned with the response of said second match filter, in response to detecting either of the temporally aligned responses of said first and second match filters currently being a substantial portion more than half of its maximum possible peak response;

a second latch register for temporarily storing the response of said second match filter, as temporally aligned with the response of said first match filter, in response to detecting either of the temporally aligned responses of said first and second match filters currently being a substantial portion more than half of its maximum possible peak response;

a subtractor for differentially combining the responses of said first and second match filters as temporarily stored in said first and second latch registers to generate a difference signal as an output signal from said subtractor; and an accumulator for said difference signal, which supplies an accumulator output signal scaled for application to said adder as said phase offset signal.

24. The digital television signal receiver of claim 21, wherein said symbol synchronizer comprises:

circuitry for temporally aligning the responses of said first and second match filters;

first and second threshold detectors respectively responsive to the temporally aligned responses of said first and second match filters, with output signals logically combined for detecting when either of the temporally aligned responses of said first and second match filters is a substantial portion more than half of its maximum possible peak response;

a first latch register for temporarily storing the response of said first match filter, as temporally aligned with the response of said second match filter, in response to detecting either of the temporally aligned responses of said first and second match filters currently being a substantial portion more than half of its maximum possible peak response;

a second latch register for temporarily storing the response of said second match filter, as temporally aligned with the response of said first match filter, in response to detecting either of the temporally aligned responses of said first and second match filters currently being a substantial portion more than half of its maximum possible peak response;

a subtractor for differentially combining the responses of said first and second match filters as temporarily stored in said first and second latch registers to generate a difference signal as an output signal from said subtractor; and an accumulator for said difference signal, which supplies an accumulator output signal scaled for application to said adder as said phase offset signal.

* * * * *